United States Patent [19]

Schaede et al.

[11] Patent Number: 5,764,367
[45] Date of Patent: *Jun. 9, 1998

[54] METHOD AND APPARATUS FOR MEASURING A POSITION OF A WEB OR SHEET

[75] Inventors: Johannes Georg Schaede; Volkmar Rolf Schwitzky, both of Würzburg, Germany

[73] Assignee: Koenig & Bauer-Albert Aktiengesellschaft, Wurzburg, Germany

[*] Notice: The term of this patent shall not extend beyond the expiration date of Pat. No. 5,724,150.

[21] Appl. No.: 570,521

[22] Filed: Dec. 11, 1995

[30] Foreign Application Priority Data

Dec. 10, 1994 [DE] Germany ............... 44 44 079.0

[51] Int. Cl.$^6$ .................................... G01N 21/84
[52] U.S. Cl. ............... 356/429; 250/559.12; 250/559.36
[58] Field of Search ................... 356/237, 429, 356/430; 250/559.16, 559.17, 559.18, 559.36, 559.12

[56] References Cited

U.S. PATENT DOCUMENTS

| 3,495,089 | 2/1970 | Brown. | |
|---|---|---|---|
| 3,696,249 | 10/1972 | Bowker | 250/559.36 |
| 3,843,264 | 10/1974 | Josse et al. | 356/429 |
| 3,989,387 | 11/1976 | Hategan | 356/430 |
| 4,004,153 | 1/1977 | Obser et al. | 356/430 |
| 5,471,066 | 11/1995 | Hagiwara | 356/237 |

FOREIGN PATENT DOCUMENTS

| 0 314 521 | 5/1989 | European Pat. Off. . | |
|---|---|---|---|
| 2 200 324 | 7/1972 | Germany . | |
| 2 202 087 | 9/1972 | Germany . | |
| 2 231 776 | 1/1974 | Germany . | |
| 24 48 611 | 3/1976 | Germany . | |
| 2242033 | 5/1990 | United Kingdom | 356/237 |

OTHER PUBLICATIONS

"Patent Abstacts of Japan"; No. JP58062504; Published Apr. 1983; vol. 7, No. 50.
Siemens–Zeitschrift "Seitenkantenregelung Laufender Warenbahnen" Von Henning Schneider; May 1972; pp. 349–352.

Primary Examiner—Frank G. Font
Assistant Examiner—Zandra V. Smith
Attorney, Agent, or Firm—Jones, Tullar & Cooper, P.C.

[57] ABSTRACT

The position of an edge of a sheet or web of material is measured by use of a beam of light passing through an opening in a diaphragm and being focused on a sensor. Anomalies on the edge of a sheet or web are prevented from providing incorrect information by proper selection of the size of the diaphragm opening.

6 Claims, 2 Drawing Sheets

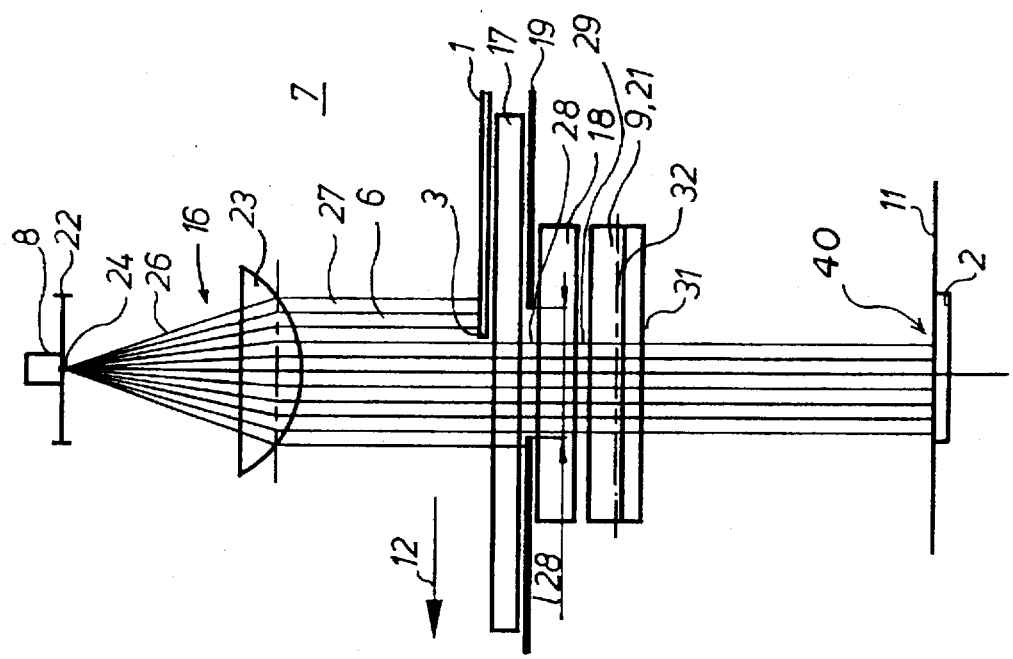
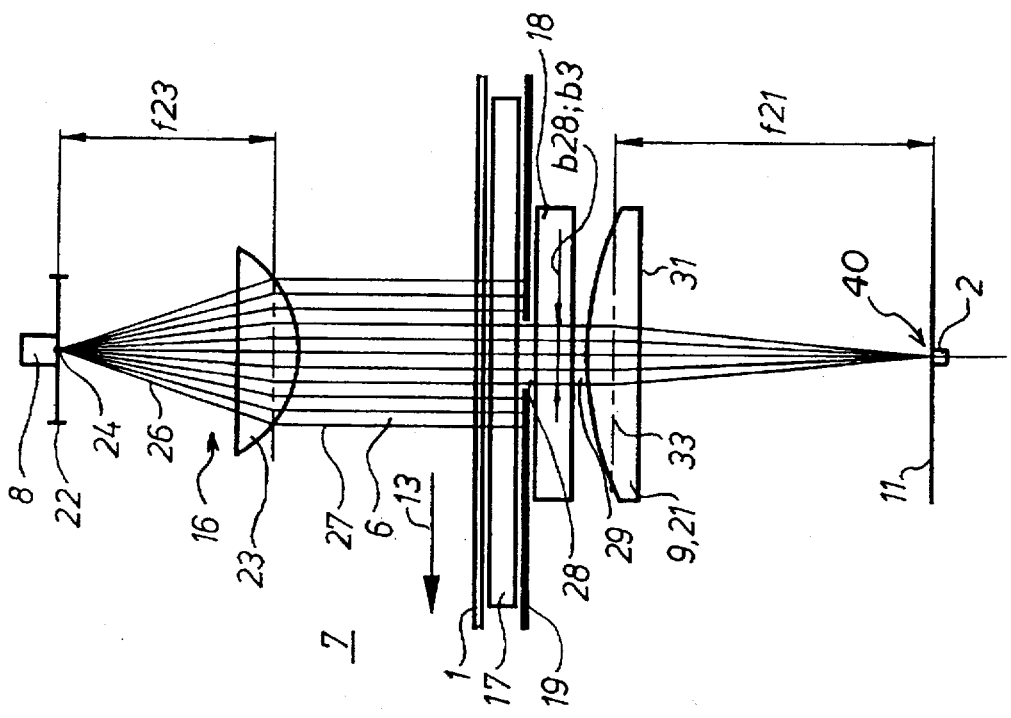

METHOD AND APPARATUS FOR MEASURING A POSITION OF A WEB OR SHEET

FIELD OF THE INVENTION

The present invention is directed generally to a method and apparatus for measuring a position of a web or sheet. More particularly, the present invention is directed to a method and apparatus for using a photoelectric measuring device to locate the edge of a web or a sheet. Most specifically the present invention is directed to a method and apparatus for locating a position of an edge of a web or a sheet having edge anomalies. The web or sheet edge is supported between a light source and a photoelectric receiver. The light source uses an upper condenser to form a generally cylindrical upper light beam bundle. This upper light beam bundle strikes the edge of the sheet or web. The portion of the light beam bundle not stopped by the web or sheet passes through a diaphragm opening and through a lower imaging lens. Minor edge anomalies may be present on the edge of the sheet or web yet do not interfere with the accurate measuring or determination of the position of the web or sheet.

DESCRIPTION OF THE PRIOR ART

In the field of printing, it is very important to be able to precisely locate and measure the position of a web or sheet that will be printed, or that has been printed in a first printing couple and that will be subsequently printed in a second printing couple. Accurate registration of the printing requires that the location of the web or sheet be accurately measured. Such a measurement must be taken frequently and thus it is also important that the measuring apparatus be capable of being operable in an efficient and dependable manner.

In the German Published, Non-Examined Patent Application No. DE-OS-22 02 087, there is disclosed a measuring system for the photoelectric measurement of a position of a sheet edge with respect to a reference line. This prior device uses light emanating from an illuminating device, with this light being received by a photoelectric receiver. A video signal is generated with this video signal corresponding to the position of the edge or a sheet that has been inserted between the illuminating device and the receiver. The photoelectric receiving element that is used in this prior device consists of a plurality of individual photoelectric elements that are arranged adjacent each other and that are positioned one behind the other.

A significant limitation of this prior art device is its inability to differentiate between the edge of the sheet or web and some type of anomaly on the edge. Even the smallest damage to the edge of the sheet or web, or the projection of a fiber beyond the sheet edge will result in a faulty measurement of the location of the edge of the sheet or web. Each such edge projection, edge tear or projecting fiber or thread will result in an incorrect measurement or determination of the position of the sheet or web edge since each of these edge anomalies can be sensed by the measuring apparatus. If each incorrect web edge sensing event results in a press shut down, it will be readily apparent that such a system cannot be used.

A need exists for a method and for a suitable apparatus for use in determining the position of an edge of a web or sheet which will not be rendered ineffective by various edge anomalies. The method and apparatus for measuring a position of a web or sheet in accordance with the present invention provides such a device and is a significant improvement over the prior art.

SUMMARY OF THE INVENTION

It is an object of the present invention to provide a method and apparatus for measuring a position of a web or sheet.

Another object of the present invention is to provide a method and apparatus for using a photoelectric measuring device to locate the edge of a sheet or web.

A further object of the present invention is to provide a method and apparatus for measuring the position of a sheet or web having web edge anomalies.

Still another object of the present invention is to provide a method and apparatus for using a photoelectric receiver with a plurality of photoelectric elements to locate the edge of a sheet or web despite the existence of web edge anomalies such as small web segments or fibers extending beyond the edge of the web.

As will be discussed in detail in the description of the preferred embodiment which is presented subsequently, the edge of the sheet or web whose position is to be detected is supported on an object holder above a diaphragm having an opening of a defined length and width. A light source and an upper light condenser are placed above the object holder. This upper light source and upper light condenser form a bundle of light rays generally in the form of a cylinder. These light rays will pass through the diaphragm opening beneath the object holder and will be focused by a lower imaging lens. These focused light beams, in the form of a focused bar of light, are received by a photoelectric device that has a length and width less than that of the diaphragm opening. An edge of a web or sheet which is supported by the object holder is positioned in the cylinder shaped upper light beam bundles. Only those light beams not striking the sheet or web will pass through the diaphragm opening and be focused on the photoelectric device. Minor edge anomalies will interfere with the passage of a portion of the beam of light but will not stop the passage of the entire beam. Thus, while the intensity of the focused beam or bar of light striking the photoelectric device may be slightly diminished by the presence of the web edge anomalies, it will still be substantially greater than the light received by that portion of the photoelectric device blocked by the sheet or web. Thus an accurate measurement of the location of the sheet or web will be obtained which will not be affected by these minor edge anomalies. While the light intensity may be blurred slightly in the longitudinal axis extending parallel to the edge of the web, it will be very sharp in the transverse axis perpendicular to the edge of the web.

So long as the web or sheet edge anomalies are small in width with respect to the width of the opening in the diaphragm which underlies the object holder, the cylinder shaped light beam bundle will not be significantly reduced in strength. The portion of the light which passes through the diaphragm opening and is then focused by the imaging lens into the focused bar of light that strikes the photoelectric receiver will still be substantially greater than the ambient light that may be received by the portion of the photoelectric device underlying the web or sheet. The photoelectric receiver is used to generate an analog video signal. The amplitude of the video signal from that portion of the photoelectric device not covered by the web is so much greater than the signal from the covered portion that the inclusion of edge anomalies on the edge of the web or sheet will not adversely affect the accuracy of the measurement of the position of the web or sheet provided by the device.

Various anomalies at the edge of the sheet or web, such as paper fibers, ragged cut edges, edge tears and the like will not hamper the operation of the device. Even if the anomaly is greater in width than the width of the photoelectric receiver, it will not create an inaccuracy, so long as the width of the anomaly is not greater than the width of the diaphragm opening. While these anomalies will reduce the light intensity, they will not adversely affect the readings of the photoelectric receiver, as was the case with the prior art devices. The electronic evaluation device can still determine the exact position of the edge of the web or sheet in spite of the difference in light intensity resulting from the existence of web or sheet edge anomalies.

Another particular advantage of the present invention is that it is possible, in accordance with the method of the invention, to evaluate not only an area of the edge corresponding to the width of the photoelectric receiver but to also evaluate an area of the edge of the web considerably greater than the width of the photoelectric receiver. The area of the web edge evaluated may be greater than the width of the photoelectric receiver by a factor of between, for example 50 and 1000. The measuring accuracy of the present invention is considerably increased by this. The various components used in the present invention are generally standard or conventional parts which are not particularly expensive.

The method and apparatus for measuring a position of a web or sheet in accordance with the present invention overcomes the limitations of the prior art. It is a substantial advance in the art.

BRIEF DESCRIPTION OF THE DRAWINGS

While the novel features of the method and apparatus for measuring a position of a web or sheet in accordance with the present invention will be set forth with particularity in the appended claims, a full and complete understanding of the invention may be had by referring to the detailed description of the preferred embodiment which is presented subsequently, and as illustrated in the accompanying drawings, in which:

FIG. 3 is a schematic side elevation view of the apparatus in accordance with the present invention and taken in the direction of a longitudinal axis of the web; and FIG. 4 is a view generally similar to FIG. 3 and taken in the transverse axis of the web.

DETAILED DESCRIPTION OF THE PREFERRED EMBODIMENT

Figure 1:
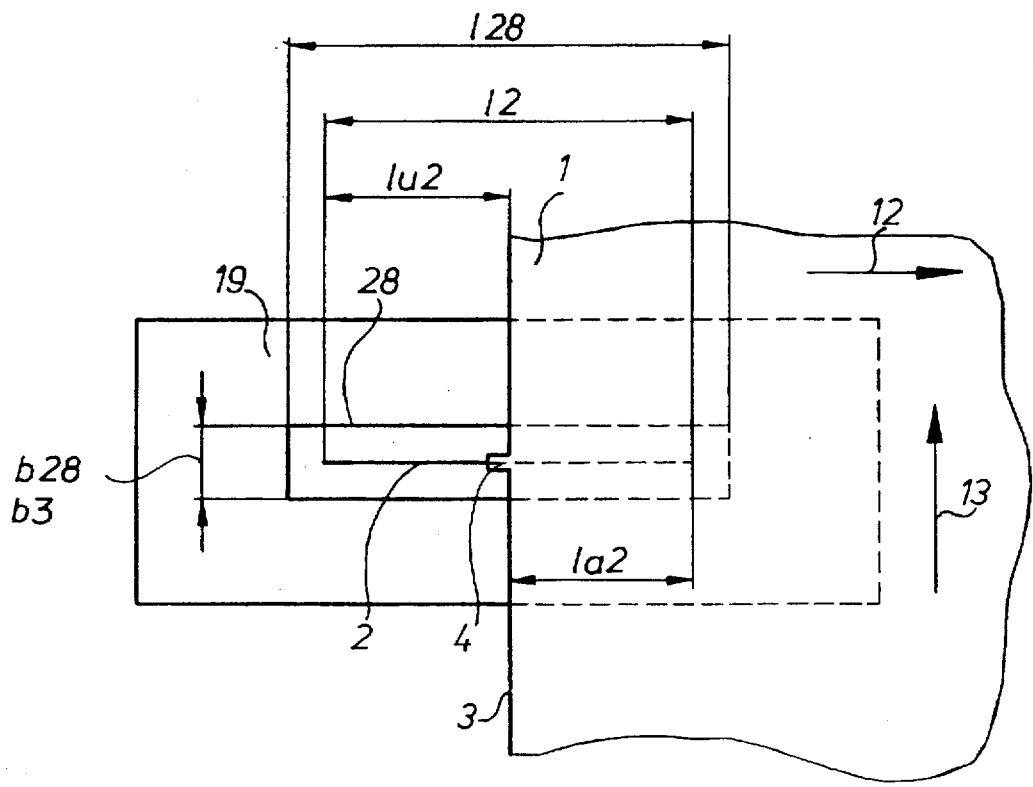
FIG. 1 is a schematic top plan view of a portion of a sheet or web whose position is to be measured and showing a photoelectric receiver in accordance with the present invention.

Referring initially to FIG. 1 and taken in conjunction with FIGS. 3 and 4, there may be seen a device for measuring the position of a web or sheet, generally at 1, in accordance with the present invention. Web or sheet 1 is provided with an edge 3 which extends as a generally straight line at least within the limits of the measuring range of the subject invention. A photoelectric receiver, generally at 2, is positioned beneath the web or sheet 1, as seen in FIGS. 1 and 2-4, and is used to determine the location is or position of the edge 3 of the sheet or web 1. The web or sheet 1 is essentially light-absorbent. In the remainder of the description of the preferred embodiment, web or sheet 1 will be referred to as web 1. Web or sheet 1 is preferably a paper web or a paper sheet that is being used in a rotary printing press. However, it is to be understood that web 1 is not to be so limited and could be any other material in the shape of a web, sheet, or panel, such as sheet metal or foil. The designation of this web or sheet as web 1 hereinafter will be primarily for the sake of simplicity.

As may be seen in FIG. 1, web 1 has an edge 3 that is not perfectly straight but rather has one or more edge anomalies 4. These edge anomalies 4 can be in the form of small edge rips or tears or can be fibers or the like which extend beyond the edge 3 of the web 1. It will be understood that the edge anomaly 4 depicted in FIG. 1 is representative of a number of possible anomalies which may exist on the edge 3 of the web 1.

The web 1, whose position is being delimited by the edge 3 having anomalies 4, is placed into a bundle 6 of light beams formed by an optical system 7. This bundle 6 of light beams emanates from a light source 8 and impacts on the photoelectric receiver 2. The edge 3, or a shadow of the edge 3 of the web 1, is pictured on the photoelectric receiver 2 in an imaging plane 11 by utilization of an optical component 9 or of a system of optical components in such a way that the image occurs or forms on the receiver 2 in a transverse imaging scale in a transverse axis 12 extending perpendicularly to the edge 3 of the web 1, and in a longitudinal imaging scale in a longitudinal axis 13 extending parallel with the edge 3 of the web 1.

The transverse imaging scale is not equal to the longitudinal image scale of the optical system 7. In a particularly advantageous manner, the transverse imaging scale can be one to one, and because in this, the conversion of measurements corresponding to the transverse imaging scale can be omitted. The edge 3 of the web 1 is evaluated over a selectable measuring width indicated at b28 in FIG. 1, and at either b28 or b3 in FIG. 3. This measuring width b3 may be, for example, 10 mm and can be defined by means of a diaphragm 19 that has an opening 28. This measuring width b3 of the edge 3 of the web 1 is imaged, in accordance with the longitudinal imaging scale, in the imaging plane 11, i.e. the edge 3 is pictured reduced in the longitudinal imaging scale.

A CCD (charge-coupled device) line sensor 2, that is generally known, can be employed as a photoelectric receiver 2 and is provided with a plurality of photoelectric elements. This CCD line sensor 2 can consist of, for example, 1726 measuring elements that are arranged in a line. These measuring elements have a size of 10 μm×13 μm, for example, and a center distance between two measuring elements is 10 μm, i.e. there are 100 measuring elements in a millimeter This results in a measuring length 12 of 17.28 mm of the described CCD line sensor 2. The usable working range can, of course, also be less than the measuring range 12. In the subject embodiment the working range corresponds to the measuring length 12.

By means of an electronic evaluation device, not specifically shown, the CCD line sensor 2 provides an analog video signal 14, which has an amplitude path corresponding to the position of the edge 3 of the web 1. In this way, as may be seen in FIG. 2, an amplitude A3 of the area of a length la2 of the CCD line sensor 2 covered by the web 1 can be minimal, for example, while the uncovered area of a length lu2 of the CCD line sensor 2 can provide an amplitude A1 corresponding to the intensity of an illumination device 16. This illumination device 16 is generally part of the optical system 7, referred to previously, and as may be seen most clearly in FIGS. 3 and 4, includes the light source 8, an upper diaphragm 22 with a narrow opening 24, and a condenser 23.

If the edge 3 of the web 1 now has one or several anomalies 4 in the area of the measuring width b3 or b2S, these web edge anomalies 4 are also represented, in a size corresponding to the longitudinal imaging scale in the imaging plane 11, and thus are represented on the CCD line sensor 2. This has the result that, in the area of the anomalies 4, a beam path of the light beam bundle 6 is changed and, depending on the size of the anomaly 4, a corresponding change in the intensity of the light beam bundle 6 from the illumination device 16 acting on the CCD line sensor 2 is generated. In this way, an amplitude A2 of the video signal 14 corresponding to the width of the anomaly 4 is created. The strength of this amplitude A2 lies between the amplitude A3 in the covered state of the CCD line sensor 2 and the amplitude A1 in the completely uncovered state of the CCD line sensor 2, as long as the anomaly 4 does not occupy the entire measuring width b3. It is now possible, by means of a suitable known electronic device, to determine the position of the edge 3 of the web 1 from this stepped video signal 14. While the amplitude of the video signal A2 will be less than the amplitude of the video signal A1, it will still be greater than the amplitude A3. Only if the width of the anomaly 4 were greater than the measuring width b3 or b28 would the amplitude A2 approach, or be reduced to the level of the amplitude A3. So long as video signal amplitude A2 remains greater than amplitude A3, the position of the edge 3 of the web 1 can be accurately determined, even if the edge 3 is rendered less than straight by the occurrence of the edge anomalies 4.

The foregoing discussion provides an overview of the apparatus for accomplishing the method of determining the position of web 1 in accordance with the present invention. The following discussion will now deal in greater detail with the structure of the apparatus in accordance with the subject invention.

A preferred embodiment of the apparatus for executing the method in accordance with the invention, as may be seen most clearly in FIGS. 3 and 4, essentially consists, for example, of an illumination device 16, an object holder 17, an IR filter 18, a diaphragm 19, an imaging lens 21 and a photoelectric receiver, for example a CCD line sensor 2. These elements are all arranged along an optical axis which is depicted as being generally vertical but need not be. The illumination device 16 essentially consists of a light source 8, which may be, for example, an infrared (IR) light source 8, an upper diaphragm 22 and a condenser 23. The upper diaphragm 22 has a very narrow diaphragm opening 24 that is, for example, a bore of a diameter of approximately 0.05 mm to 1 mm and is disposed directly beneath the IR light source 8, which emits light in a wavelength of 750 nm, for example. An approximately dot-shaped IR light source is created by this arrangement of light 8 and upper diaphragm 22. The condenser 23 is located beneath the light source 8 at a distance f23 which corresponds to a focal length f23 of the condenser 23. The IR light source 8 is thus located in the front focal point of the condenser 23. In the preferred embodiment, as depicted in FIGS. 3 and 4, a non-spherical lens is used as the condenser 23. The condenser 23 can also consist of several lenses, for example a combination of a concave-convex lens and one or several non-spherical lenses. In the present embodiment, the condenser 23 aligns the light beams 26 emanating from the dot-shaped IR light source 8 in a parallel manner and into a cylinder-shaped light beam bundle 27 having these parallel beams. Other light sources radiating light beams, for example a laser curtain, can also be used as illumination devices 16 to obtain a directed light beam bundle 27.

A plane-parallel glass plate 17 is disposed perpendicularly with respect to the light beam bundle 27 and constitutes the object holder 17. The parallel light beam bundle 27 passes vertically through the glass plate 17 and strikes a lower diaphragm 19 which, as seen in FIGS. 3 and 4, is disposed directly below or beneath the glass plate 17. This lower diaphragm 19 limits the light beam bundle 27 to a size defined by a diaphragm opening 28 having a width b28 of, for example, 5 mm, and a length l28 of, for example, 20 mm. The lower diaphragm 19 is disposed approximately centered and vertically with respect to the light beam bundle 27. In this way, imaging errors that may be created in the edge areas of the condenser 21 and that may appear as non-parallel beams, are eliminated to a large extent. The length l28 of diaphragm opening 28 of the lower diaphragm 19, which extends generally perpendicularly with respect to the edge 3 to be measured, is preferably slightly longer than the measuring length 12 of the CCD line sensor 2. The width b28 of the diaphragm opening 28 of the diaphragm 19, that extends parallel with the edge 3 to be measured, determines the length b3, for example 2 mm to 8 mm, of the edge 3 included in the measurement of the web position. In other words, the lower diaphragm opening 28 is of a size so that the CCD sensor 2 has a clear, unobstructed view of the edge 3 of the web 1.

An IR filter 18 is situated after the lower diaphragm 19, in the direction of travel of the light beams 27, and has the job of eliminating the effects of daylight on the photoelectric receiver 2. A rectangular shaped lower light beam bundle 29 of parallel light rays and of a width b28 and a length l28 enters an imaging lens 21 which is disposed after, in the direction of travel of the light rays, the diaphragm 19 and the IR filter 18. This imaging lens 21 has a transverse imaging scale along a transverse axis 12, and a longitudinal imaging scale, which differs from the transverse imaging scale, in the longitudinal axis 13 extending is perpendicularly to the transverse axis 12. In the preferred embodiment, the imaging lens 21 is structured as a cylindrical lens 21 which is disposed in the light beam bundle 29 in such a way that its plane side 31 lies parallel with the glass plate 17 and its longitudinal axis 32 is perpendicular to the edge 3 of the web 1 to be measured. This cylindrical lens 21 passes the lower parallel light beam bundle 29 along its longitudinal axis 32 at the longitudinal imaging scale of one to one, while it focuses the light beam bundle 29 along its transverse axis 33. The CCD line sensor 2 is disposed at a distance f21 in respect to the main plane of the cylindrical lens 21, with this distance f21 corresponding to a focal length f21 of the cylindrical lens 21. The parallel impinging light beam bundle 29 is focused by the cylindrical lens 21 to form a bar, or beam of light 40 extending parallel with the longitudinal axis 22 of the cylindrical lens 21. The length of the bar of light 40, when the diaphragm opening 28 is uncovered, corresponds to the length l28 of the lower diaphragm opening 28 and thus to the length of the light beam bundle 29.

Figure 2:
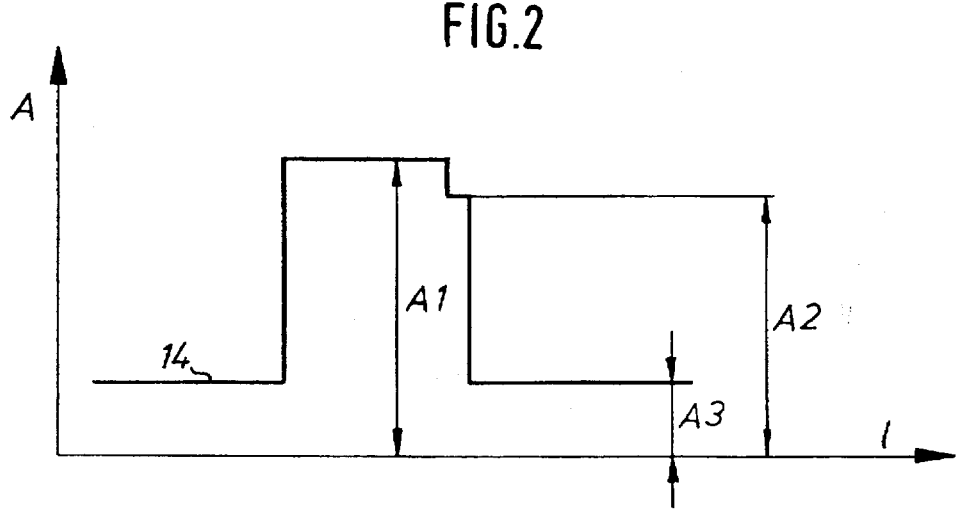
FIGS. 2 is a graph showing the relative strengths of video signals which correspond to the position of the web.

If an edge 3 of a web 1 whose position is to be measured is placed on the object holder 17 in such a position that it partly overlies the lower diaphragm opening 28, a portion of the light beam 29 which would otherwise pass through the lower diaphragm opening 28 and form part of the bar of light 40 focused on the photoelectric receiver 2 is now prevented from doing so. The position of the edge 3 of the web 1 can be determined in the manner, as discussed previously, by measuring the amplitudes of the analog video signals resulting from the CCD sensor 2. If the edge 3 of the web 1 has various anomalies, such as the one schematically represented at 4, and so long as the width of any anomaly 4 is less than the width b28 of the lower diaphragm aperture or opening 28, the amplitude A2 of the analog video signal, as depicted in FIG. 2, will still be sufficiently greater than the amplitude A3 of the video signal emanating from the completely blocked portion of the CCD sensor 2. Thus the position of the edge 3 of the web 1 can still be accurately ascertained, even when web edge 3 is flawed by the existence of one or more web edge anomalies 4. The analog video signal 14 generated by the CCD sensor 2, as depicted in FIG. 2, can be evaluated by a suitable electronic evaluation device and will provide the necessary data to accurately determine the position of the web 1.

While a preferred embodiment of a method and apparatus for measuring a position of a web or sheet in accordance with the present invention has been set forth fully and completely hereinabove, it will be apparent to one CL skill in the art that a number of changes in, for example, the type of printing press used, the specific size of the web or sheet, the means used for transporting the web or sheet and the like may be made without departing from the true spirit and scope of the present invention which is accordingly to be limited only by the following claims.

What is claimed is:

1. A method for measuring the position of an edge of a web including:

generating a light beam bundle using an illuminating device;

forming said light beam bundle into a shaped light beam;

providing a photoelectric receiver having a plurality of photoelectric elements arranged at short distances from each other;

positioning said photoelectric receiver to receive said shaped light beam;

positioning an optical system between said illuminating device and said photoelectric receiver and in the path of said light beam, said optical system having a longitudinal imaging first scale and a transverse imaging second scale, said first and second scales being different;

providing an imaging lens between said illuminating device and said photoelectric receiver;

focusing said shaped light beam passing through said imaging lens and forming a focused bar of light;

directing said focused bar of light onto said photoelectric receiver;

locating said web edge having anomalies between said illuminating device and said imaging lens and partly overlying said photoelectric receiver; and using a change in light intensity of said focused bar of light formed on said photoelectric receiver to measure the position of said web.

2. The method of claim 1 further including providing said longitudinal imaging scale parallel with said edge of said web.

3. An apparatus for measuring the position of an edge of a web comprising:

an illuminating device emitting a directed light beam;

means for forming said light beam into a shaped light beam;

a photoelectric receiver positioned to receive said directed light beam, said photoelectric receiver including a plurality of photoelectric elements arranged at short distances from each other;

an optical system positioned intermediate said illuminating device and said photoelectric receiver and having a first, transverse imaging scale extending perpendicularly to said web edge and a second, longitudinal imaging scale extending parallel with said web edge, said first and second imaging scales being unequal and an imaging lens in said optical system intermediate said web edge and said photoelectric receiver, said imaging lens forming light passing through said imaging lens into a focused bar of light, said web edge being positioned in said shaped light beam intermediate said illuminating device and said imaging lens and partly overlying said photoelectric receiver.

4. The apparatus for measuring the position of an edge of a web in accordance with claim 3 wherein said imaging lens is a cylindrical lens having a longitudinal axis, said longitudinal axis extending perpendicular to said web edge to be measured.

5. The apparatus for measuring the position of an edge of a web in accordance with claim 3 further including providing a diaphragm in said optical system, said diaphragm having a diaphragm opening having a length and a width sufficient to allow said directed light beam to pass through said diaphragm opening and to contact said photoelectric receiver.

6. An apparatus for measuring the position of an edge of a web comprising:

an illuminating device emitting a directed light beam;

a photoelectric receiver positioned to receive said directed light beam, said photoelectric receiver including a plurality of photoelectric elements arranged at short distances from each other; and an optical system having at least one imaging lens, said optical system being positioned intermediate said illuminating device and said photoelectric receiver and having a first, transverse imaging scale extending perpendicularly to said web edge and a second, longitudinal imaging scale extending parallel with said web edge, said first and second imaging scales being unequal, said imaging lens being a cylindrical lens having a longitudinal axis, said longitudinal axis extending perpendicular to said web edge to be measured.

* * * * *

UNITED STATES PATENT AND TRADEMARK OFFICE
CERTIFICATE OF CORRRECTION

PATENT NO. : 5,764,367
DATED : June 9, 1998
INVENTOR(S) : Johannes Georg Schaede, et al.

It is certified that error appears in the above-identified patent and that said Letters Patent is hereby corrected as shown below:

On the title page, item 56 add the following:

| OTHER ART (Including Author, Title, Pertinent Pages, etc.) |
| --- |
| |
| JAPANESE DOCUMENT NO. 60-080703; MAY 8, 1985; HOKUYO AUTOMATIC CO. |
| JAPANESE DOCUMENT NO. 60-115805; JUNE 22, 1985; ANRITSU CORP. |
| JAPANESE UTILITY MODEL NO. 1-110310; JULY 25, 1989; KOGYO |

Signed and Sealed this

Nineteenth Day of October, 1999

Attest:

Q. TODD DICKINSON

*Attesting Officer*   *Acting Commissioner of Patents and Trademarks*